United States Patent
Lee

(10) Patent No.: US 6,777,900 B2
(45) Date of Patent: Aug. 17, 2004

(54) METHOD FOR CONTROLLING HEAR DISSIPATION OF ELECTRONIC DEVICE

(75) Inventor: Hung-Pin Lee, Shinjuang (TW)

(73) Assignee: Mitac Technology Corp., Hsin-Chu (TW)

( * ) Notice: Subject to any disclaimer, the term of this patent is extended or adjusted under 35 U.S.C. 154(b) by 61 days.

(21) Appl. No.: 10/329,381

(22) Filed: Dec. 27, 2002

(65) Prior Publication Data

US 2003/0201741 A1 Oct. 30, 2003

(30) Foreign Application Priority Data

Apr. 30, 2002 (TW) ........................................ 91108935 A

(51) Int. Cl.[7] .............................. H02P 1/40; H02P 5/00; H02P 7/00
(52) U.S. Cl. ...................... 318/268; 318/138; 318/254; 318/439; 318/471; 318/473; 700/300; 713/300; 713/322; 702/132
(58) Field of Search .......................... 318/268, 430–434, 318/471, 473, 474, 138, 254, 439, 700, 484, 800; 388/921, 934; 713/300, 322; 361/687, 688; 702/130, 132

(56) References Cited

U.S. PATENT DOCUMENTS

| | | | | |
|---|---|---|---|---|
| 4,366,425 A | * | 12/1982 | Shen ........................... | 318/779 |
| 5,664,201 A | * | 9/1997 | Ikedea ......................... | 713/320 |
| 5,752,011 A | * | 5/1998 | Thomas et al. .............. | 713/501 |
| 5,847,526 A | * | 12/1998 | Lasko et al. ................. | 318/471 |
| 5,930,736 A | * | 7/1999 | Miller et al. ................. | 702/127 |
| 6,134,667 A | * | 10/2000 | Suzuki et al. ............... | 713/300 |
| 6,191,546 B1 | * | 2/2001 | Bausch et al. .............. | 318/471 |
| 6,194,858 B1 | * | 2/2001 | Chen ........................... | 318/473 |
| 6,216,235 B1 | * | 4/2001 | Thomas et al. ............. | 713/501 |
| 6,336,080 B1 | * | 1/2002 | Atkinson ..................... | 702/132 |
| 6,400,113 B1 | * | 6/2002 | Garcia et al. ............... | 318/463 |
| 6,470,289 B1 | * | 10/2002 | Peters et al. ................ | 702/132 |
| 6,510,400 B1 | * | 1/2003 | Moriyama ................... | 702/132 |
| 6,528,987 B1 | * | 3/2003 | Blake et al. ................ | 324/168 |
| 6,601,168 B1 | * | 7/2003 | Stancil et al. ............... | 713/100 |
| 6,617,815 B1 | * | 9/2003 | Krief .......................... | 318/471 |
| 6,630,754 B1 | * | 10/2003 | Pippin ........................ | 307/117 |
| 6,646,396 B2 | * | 11/2003 | Brown et al. ............... | 318/268 |
| 6,647,320 B1 | * | 11/2003 | Inoue ......................... | 700/300 |
| 6,654,894 B2 | * | 11/2003 | Kaminski et al. ........... | 713/300 |

FOREIGN PATENT DOCUMENTS

| | | | | | |
|---|---|---|---|---|---|
| JP | 411065712 A | * | 3/1999 | ............. | G06F/1/20 |
| JP | 11-237931 | * | 8/1999 | ............. | G05F/1/10 |
| JP | 2000-187523 | * | 7/2000 | ............. | G06F/1/08 |

\* cited by examiner

*Primary Examiner*—David Martin
*Assistant Examiner*—Tyrone Smith
(74) *Attorney, Agent, or Firm*—Rosenberg, Klein & Lee

(57) ABSTRACT

A method for controlling heat dissipation of an electronic device, such as a central processing unit, by controlling rotational speed of a fan and supplying a clock signal with slower clock frequency to the electronic device is disclosed. The fan rotates at a speed in proportion to the temperature of the electronic device when the temperature of the electronic device is below a maximum reference temperature. The fan rotates at a maximum rotational speed when the temperature of the electronic device is beyond the maximum reference temperature. The fan rotates at a maximum rotational speed and a clock signal with slower clock frequency is supplied to the electronic device when the temperature of the electronic device is beyond both the maximum reference temperature and a slowing-clock starting reference temperature, until the temperature of the electronic device drops below a slowing-clock ending reference temperature.

6 Claims, 4 Drawing Sheets

METHOD FOR CONTROLLING HEAR DISSIPATION OF ELECTRONIC DEVICE

BACKGROUND OF THE INVENTION

1. Field of the Invention

The present invention relates generally to a method for controlling heat dissipation of an electronic device, such as a central processing unit of a computer, and in particular to a method for controlling heat dissipation of the electronic device based on the temperature of the electronic device.

2. Description of the Prior Art

It is known that electronic devices, such as a microprocessor or a central processing unit (CPU) of a computer system, must operate in a predetermined range of temperature. Over-temperature causes malfunction of the electronic device. Since the electronic device generates heat when operating, it is necessary to properly remove or dissipate the heat generated during the operation of the electronic device in order to maintain proper operation thereof.

Conventionally, a fan is generally mounted to an electronic device for generating airflow to induce force convection to the electronic device in order to remove heat generated by the electronic device. The rotational speed of the fan is generally designed to be constant that meets the full load operation thereof. Thus the airflow induced by the fan and the amount of heat removed by the airflow per unit time are fixed. This leads to unnecessary consumption of electrical power energy when the electronic device does not have such a high temperature that requires the full load operation of the fan.

Since power energy is generally limited and is thus a valuable resource of a portable electronic device, such as notebook computer or portable computer, the unnecessary power consumption reduces the operation time period that a battery of the notebook computer can support.

A stepwise approach is known in controlling the operation of a heat dissipation fan in prior art. The approach divides the operation of the fan into a number of stepwise levels each associated with a predetermined rotational speed of the fan. When the operating temperature of the electronic device reaches a lower bound of one specific level, the fan is controlled to operate at a rotational speed associated with the specific level. The lower bound of one level is the upper bound of the next lower level whereby when the temperature drops below the lower bound, the rotational speed of the fan is reduced to a value corresponding to the next lower level. Thus, the rotational speed of the fan jumps back and forth between successive levels when the temperature of the electronic device fluctuates. Such a sudden change in rotational speed of the fan causes undesired noise.

In addition, although the prior art stepwise approach reduces unnecessary power consumption, since the rotational speed of the fan maintains fixed in a given level between the upper and lower bounds thereof, there is still an unnecessary waste of power.

For certain industrial applications of computers, the electronic device operates at a very heavy load condition. This generates a huge amount of heat during the operation of the electronic device. Such a huge amount of heat can sometimes not be timely removed by the fan. Other method must be employed to reduce the amount of heat generated by the electronic device in order not to cause undesired damage to the electronic device. One feasible way is to decrease the clock frequency of the electronic device, which effectively reduces the operation load of the electronic device and thus remove the heat generated by the electronic device.

SUMMARY OF THE INVENTION

Thus, the primary object of the present invention is to provide a method for controlling heat dissipation of an electronic device by a fan assembly wherein the rotational speed of the fan is changed in proportion to the temperature change of the electronic device in a stepless fashion whereby no undesired noise occurs in changing rotational speed of the fan.

Another object of the present invention is to provide a method for controlling heat dissipation of an electronic device by a fan assembly whereby unnecessary power consumption is reduced.

A further object of the present invention is to provide a method for controlling heat dissipation of an electronic device by means of controlling a fan assembly to induce a force convection to remove heat generated by the electronic device and decreasing the clock frequency of the clock signal supplied to the electronic device so as to reduce the amount of heat generated by the electronic device thereby effectively maintaining the temperature of the electronic device in an acceptable range.

To achieve the above objects, in accordance with the present invention, a method for controlling heat dissipation of an electronic device, such as a microprocessor or a central processing unit, with the aid of a heat dissipation fan is provided. The method mainly comprises the following steps: detecting the temperature of the electronic device; comparing the temperature of the electronic device with the maximum reference temperature; rotating the fan in proportion to the temperature of the electronic device when the temperature of the electronic device is below the maximum reference temperature; rotating the fan at a maximum rotational speed when the temperature of the electronic device is beyond the maximum reference temperature; comparing the temperature of the electronic device with the slowing-clock starting reference temperature; rotating the fan at a maximum rotational speed and supplying a slower clock frequency with respect to the regular clock frequency of the clock signal to the electronic device when the temperature of the electronic device is beyond both the maximum reference temperature and the slowing-clock starting reference temperature; and maintaining the maximum rotational speed of the fan and supplying the slower clock frequency of the clock signal to the electronic device until the temperature of the electronic device drops below the slowing-clock ending reference temperature.

Preferably, the fan is turned off when the detected temperature of the electronic device is below a preset minimum reference temperature that is smaller than the maximum reference temperature.

Controlling the rotational speed of the fan in proportion to the temperature of the electronic device avoids sudden change of the fan speed and thus eliminating noise caused thereby. In addition, slowing down the clock frequency of the clock signal supplied to the electronic device effectively reduces the amount of heat generated by the electronic device and thus allowing the temperature of the electronic device to be brought down to proper working temperature thereof in case the fan itself is not sufficient to remove heat from the electronic device.

BRIEF DESCRIPTION OF THE DRAWINGS

The present invention will be apparent to those skilled in the art by reading the following description of a best mode of the operation of the method, with reference to the attached drawings, in which.

DETAILED DESCRIPTION OF THE PREFERRED EMBODIMENTS

Figure 1:
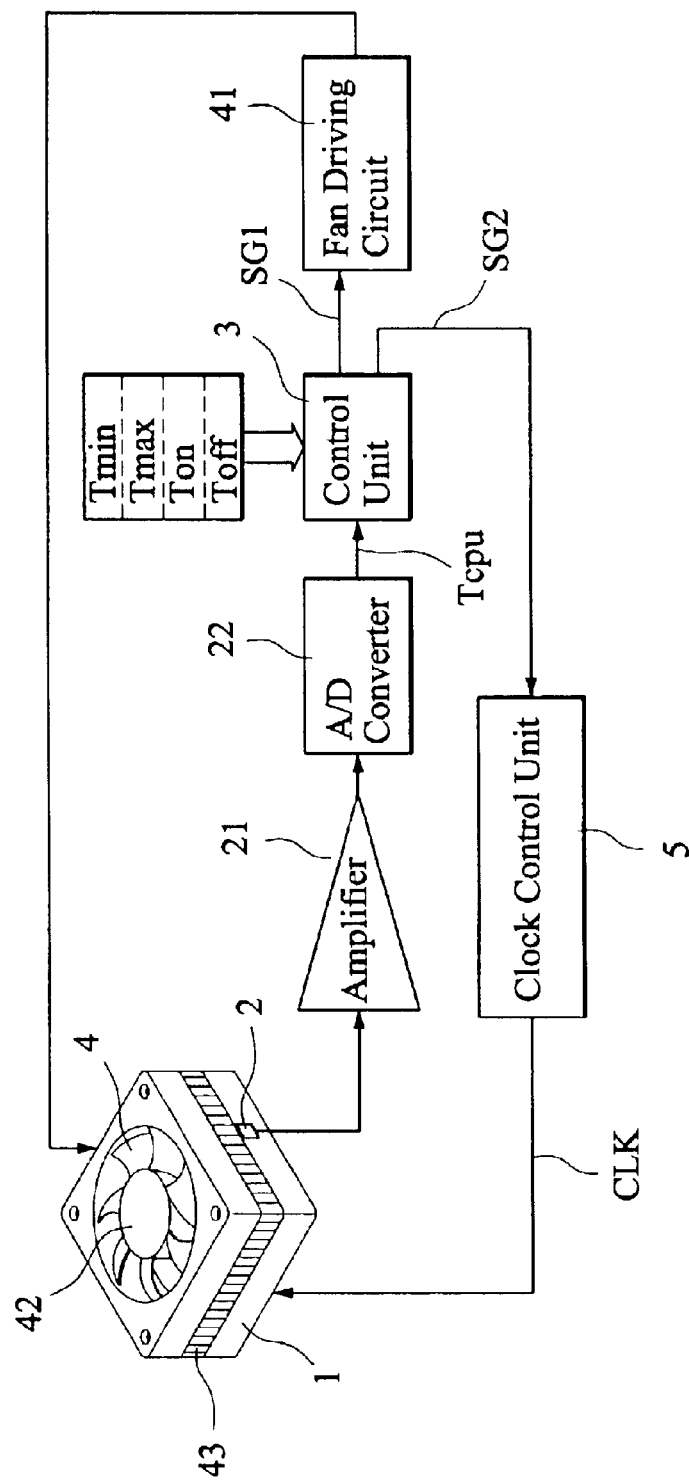
FIG. 1 is a functional block diagram of a control circuit embodying a method for controlling heat dissipation of an electronic device in accordance with a first embodiment of the present invention.

With reference to the drawings and in particular to FIG. 1, it shows that an electronic device 1 is equipped with a heat dissipation device for removing heat generated from the electronic device 1. The heat dissipation device 1 includes a heat sink 43 mounted thereon and in physical contact with the upper surface of the electronic device 1. A fan assembly composed of a fan 4 and a motor 42 is further mounted on the heat sink 43. The fan 4 is driven by the motor 42 to generate airflow through the heat sink 43 for force convection of the heat transferred to the heat sink 43 from the electronic device 1.

In the embodiment illustrated in FIG. 1, the electronic device 1 is a central processing unit (CPU) normally mounted on a printed circuit board of a computer system, which generates an amount of heat during operation.

In accordance with the present invention, a thermal sensor or a temperature sensing element 2 is attached to the electronic device 1 for detecting the temperature of the electronic device 1. The temperature sensing element 2 is electrically coupled to an input end of a signal amplifier 21, capable of generating an analog signal representing the temperature of the electronic device 1. The analog temperature signal of the temperature sensing element 2 is first amplified by the signal amplifier 21 and converted into a digital temperature signal Tcpu by an analog-to-digital converter (A/D converter) 22.

The digital temperature signal Tcpu that represents the temperature of the electronic device 1 is transmitted to a control unit 3. In response to the received temperature signal Tcpu, the control unit 3 generates a fan speed control signal SG1 and a clock rate slowing control signal SG2 based on a number of predetermined reference signals. In a preferred embodiment of the present invention, the predetermined reference signals include a minimum reference temperature (Tmin), a maximum reference temperature (Tmax), a slowing-clock starting reference temperature (Ton) and a slowing-clock ending reference temperature (Toff).

The fan speed control signal SG1 is applied to a fan driving circuit 41, so that the rotational speed of the fan 4 is controllable by the fan driving circuit 41 in response to the fan speed control signal SG1. In the embodiment illustrated, the fan 4 is an axial flow type fan capable of causing an axial airflow through the heat sink 43. In accordance with the present invention, the fan 4 is controlled so that the rotational speed thereof is substantially in proportion to the temperature of the electronic device 1. This will be further discussed with reference to FIGS. 2 and 3.

The clock rate slowing control signal SG2 is applied to a clock control unit 5 for slowing down the clock rate of a clock signal CLK generated by the clock control unit 5. The clock control unit 5 may be a clock generator capable of generating at least one system clock signal to the central processing unit of a personal computer system. By slowing the clock rate of the clock signal CLK supplied to the electronic device 1, the amount of heat generated by the electronic device 1 is therefore decreased.

The control unit 3 may be any known control devices, such as a microprocessor-based control device or a logic circuit. Since this is well known to those skilled in the art of electronic and control, no further details will be needed herein.

Figure 2:
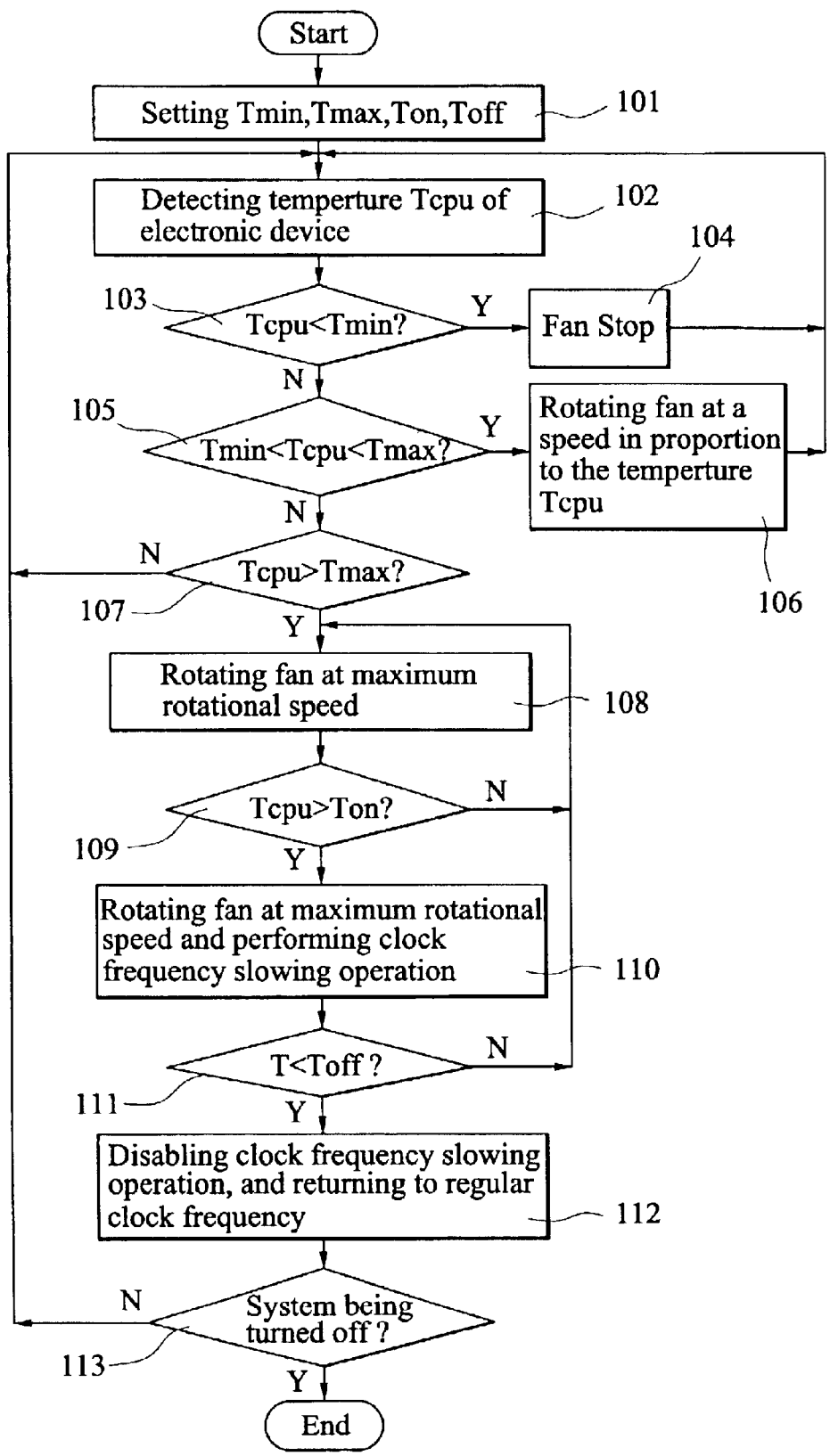
FIG. 2 is a flow chart of the method in accordance with the first embodiment of the present invention.

Referring to FIG. 2, it is a flow chart of the method in accordance with the present invention. In step 101, the four reference signals Tmin, Tmax, Ton and Toff representing the minimum reference temperature, the maximum reference temperature, the slowing-clock starting reference temperature, and the slowing-clock ending reference temperature respectively are initially set in advance to the control unit 3.

In step 102, the control unit 3 receives the temperature signal Tcpu which represents the actual operational temperature in digital form of the electronic device 1. In normal operational condition, a clock signal CLK with a regular clock frequency, normally highest clock frequency acceptable by the electronic device, is supplied to the electronic device 1.

In step 103, the control unit 3 compares the temperature signal Tcpu of the electronic device 1 with the preset minimum reference temperature Tmin to determine if the temperature signal Tcpu of the electronic device 1 is below the minimum reference temperature Tmin. The preset minimum reference temperature Tmin is a threshold reference temperature above which the fan 4 is turned on and below which the fan 4 is turned off. If the temperature signal Tcpu is below the minimum reference temperature Tmin, the fan 4 is turned off (step 104) and as shown by line segment S1 in FIG. 3, namely the rotational speed R of the fan 4 is set to zero.

When the temperature signal Tcpu of the electronic device rises to above the minimum reference temperature Tmin, the control unit 3 checks if the electronic device temperature Tcpu is greater than the maximum reference temperature Tmax in step 105. If the electronic device temperature Tcpu reaches the minimum reference temperature Tmin, the fan 4 is turned on and rotates at a preset minimum rotational speed R1.

Figure 3:
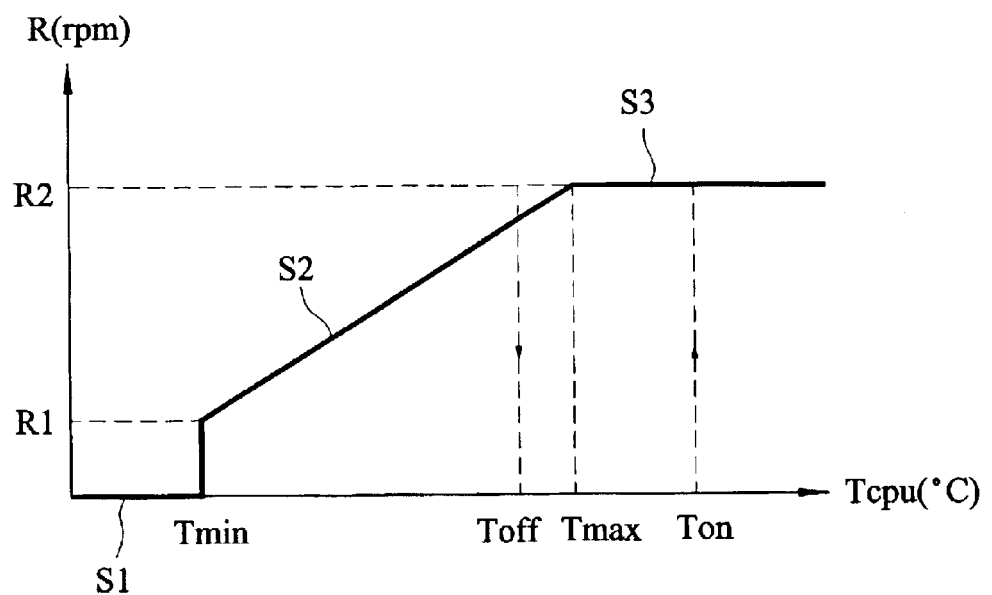
FIG. 3 is a plot of rotational speed of a fan controlled in accordance with the first embodiment of the present invention for removing heat from an electronic device vs. temperature of the electronic device.

In step 106, when the electronic device temperature Tcpu is between the minimum reference temperature Tmin and the maximum reference temperature Tmax, then the fan 4 rotates at a speed increased from R1 and proportional to the temperature Tcpu of the electronic device, with reference to line segment S2 of FIG. 3. The rotational speed of the fan 4 is changed in a linear and stepless manner in proportion to the temperature Tcpu of the electronic device 1, until the electronic device temperature Tcpu reaches the maximum reference temperature Tmax where the fan 4 rotates at a maximum rotational speed R2. When the electronic device temperature Tcpu is greater than the maximum reference temperature Tmax as being checked in step 107, the fan 4 rotates at a maximum rotational speed R2, as indicated in step 108, with reference to line segment S3 shown in FIG. 3.

The fan speed control signal SG1 is generated to be substantially proportional to the electronic device temperature Tcpu. This can be done by properly programming the microprocessor-based control unit 3. Alternatively, a kwon pulse width modulation (PWM) technology can be employed. This is known to those skilled in the electronic field and no further detail will be given herein.

As noted from the description above, within the temperature range between the minimum reference temperature Tmin and the maximum reference temperature Tmax, the rotational speed R of the fan 4 is changed in proportion to the change of the electronic device temperature Tcpu. When the electronic device temperature Tcpu increases, the rotational speed R increases and when the electronic device temperature Tcpu decreases, the rotational speed R decreases. Since the temperature sensing element 2, the control unit 3, the fan driving circuit 41 and the fan 4 form a closed feedback circuit loop, the temperature of the electronic device 1 and the rotational speed of the fan 4 will eventually reach an equilibrium point where the temperature of the electronic device maintains constant.

In case that the electronic device temperature Tcpu continuously increases after it reaches the preset maximum reference temperature Tmax, the fan 4 is operated at the maximum rotational speed R2 and there is no way to further remove heat from the electronic device 1 by simply manipulating the fan 4.

Thus, after the rotational speed R of the fan 4 reaches the maximum rotational speed R2, in step 109, the control unit 3 further checks if the electronic device temperature Tcpu is greater than the slowing-clock starting reference temperature Ton. If not, the fan 4 maintains at its maximum rotational speed R2 as indicated by step 108. If yes, the fan 4 still maintains its maximum rotational speed R2 to remove heat with the full performance thereof in step 110, and at the moment a clock frequency slowing operation is performed. In the clock frequency slowing operation, the control unit 3 sends out the clock rate slowing control signal SG2 to the clock control unit 5 in order to slowing down the clock frequency of the clock signal CLK supplied to the electronic device 1.

By means of slowing down the clock frequency of the clock signal CLK to the electronic device 1, as is well known, the load of the electronic device 1 is effectively reduced. Theoretically, the amount of heat generated by the electronic device 1 is reduced. Thus, the electronic device temperature Tcpu decreases correspondingly.

In step 111, the control unit 3 checks if the electronic device temperature Tcpu drops below the slowing-clock ending reference temperature Toff which is below the maximum reference temperature Tmax and beyond the minimum reference temperature Tmin. If negative, then the control unit 3 maintains the maximum rotational speed R2 of the fan 4. If positive, then at step 112, the control unit 3 disables the clock rate slowing control signal SG2 to the clock control unit 5, so that the clock frequency of the clock signal CLK supplied to the electronic device 1 returns to the original clock frequency. At step 113, the control unit 3 checks if the system is turned off. If negative, the control unit 3 returns to step 102 to go over the whole processes described above again.

In a simplified alternative of the method in accordance with the present invention, the clock rate slowing control signal SG2 is activated at the moment when the electronic device temperature Tcpu goes beyond the maximum reference temperature Tmax and de-activated when the electronic device temperature Tcpu drops below the minimum reference temperature Tmin.

Figure 4:
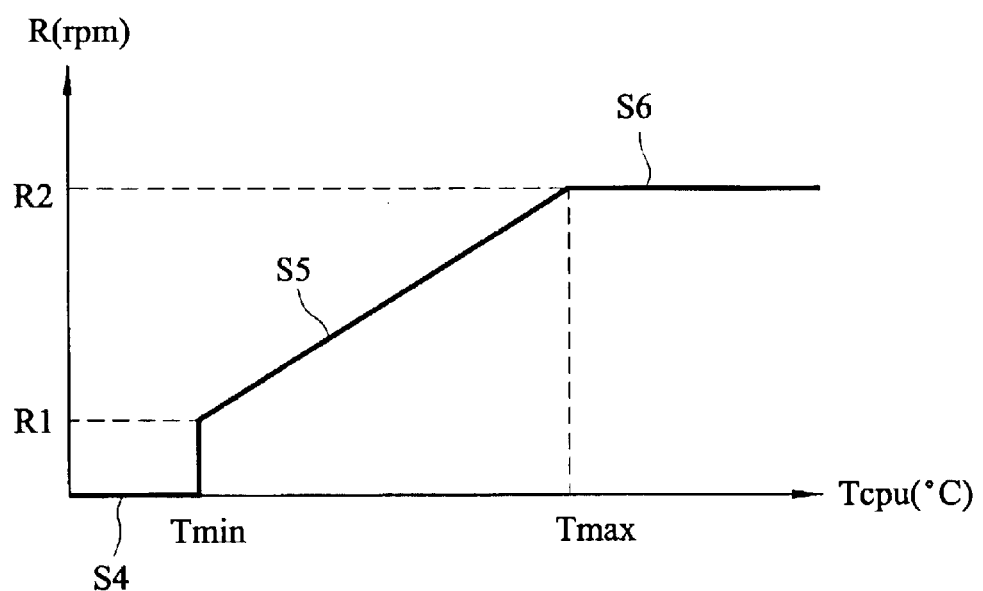
FIG. 4 is a plot of rotational speed of a fan controlled in accordance with a second embodiment of the present invention for removing heat from an electronic device vs. temperature of the electronic device.

With reference to FIG. 4, when the electronic device temperature Tcpu is below the minimum reference temperature Tmin, the fan 4 is turned off, as shown by line segment S4, namely the rotational speed R of the fan 4 is set to zero. When the electronic device temperature Tcpu is between the minimum reference temperature Tmin and the maximum reference temperature Tmax, the rotational speed R of the fan 4 is changed in proportion to the change of the electronic device temperature Tcpu (line segment S5). In other words, the rotational speed R of the fan 4 is changed between the minimum rotational speed R1 and the maximum rotational speed R2, in a linear manner with respect to the change of electronic device temperature Tcpu between Tmin and Tmax. After the electronic device temperature Tcpu goes beyond the maximum reference temperature Tmax, the rotational speed of the fan 4 is maintained at the maximum rotational speed R2 (line segment S6) and the clock rate slowing control signal SG2 is activated. When the electronic device temperature Tcpu drops below the maximum reference temperature Tmax, the clock rate slowing control signal SG2 is de-activated and the rotational speed R is again changed in accordance with the actual temperature of the electronic device 1.

Since the rotational speed of the fan 4 is controlled in a linear fashion in proportion to the temperature of the electronic device 1, there is no sudden change of the fan speed and thus noise caused by such sudden change of speed is effectively eliminated. In addition to the control of the fan speed to power-efficiently removing heat from the electronic device, the performance of slowing the clock frequency of the clock signal supplied to the electronic device is activated when the electronic device temperature goes beyond a preset threshold further reduces the temperature of the electronic device by reducing the amount of heat generated by the electronic device.

Although the present invention has been described with reference to the best modes of operation thereof, it is apparent to those skilled in the art that a variety of modifications and changes may be made without departing from the scope of the present invention which is intended to be defined by the appended claims.

What is claimed is:

1. A method for controlling a heat dissipation of an electronic device by controlling a fan, the electronic device being operated in accordance with a regular clock frequency of a clock signal, comprising the following steps:

(a) presetting a plurality of reference temperatures at least comprising a maximum reference temperature, a slowing-clock starting reference temperature, and a slowing-clock ending reference temperature;

(b) detecting a temperature of the electronic device;

(c) comparing the temperature of the electronic device with the maximum reference temperature;

(d) rotating the fan in proportion to the temperature of the electronic device when the temperature of the electronic device is below the maximum reference temperature;

(e) rotating the fan at a maximum rotational speed when the temperature of the electronic device is beyond the maximum reference temperature;

(f) comparing the temperature of the electronic device with the slowing-clock starting reference temperature;

(g) rotating the fan at a maximum rotational speed and supplying a slower clock frequency with respect to the regular clock frequency of the clock signal to the electronic device when the temperature of the electronic device is beyond both the maximum reference temperature and the slowing-clock starting reference temperature; and (h) maintaining the maximum rotational speed of the fan and supplying the slower clock frequency of the clock signal to the electronic device until the temperature of the electronic device drops below the slowing-clock ending reference temperature.

2. The method as claimed in claim 1, wherein the slowing-clock starting reference temperature is greater than the maximum reference temperature.

3. The method as claimed in claim 1, further comprising a step of stopping the fan when the detected temperature of the electronic device is below a minimum reference temperature that is smaller than the maximum reference temperature.

4. The method as claimed in claim 1, wherein the slowing-clock ending reference temperature is smaller than the maximum reference temperature.

5. A method for controlling a heat dissipation of an electronic device by controlling a fan, the electronic device being operated in accordance with a regular clock frequency of a clock signal, comprising the following steps:

(a) presetting a maximum reference temperature;

(b) detecting a temperature of the electronic device;

(c) comparing the temperature of the electronic device with the maximum reference temperature;

(d) rotating the fan in proportion to the temperature of the electronic device when the temperature of the electronic device is below the maximum reference temperature;

(e) rotating the fan at a maximum rotational speed when the temperature of the electronic device is beyond the maximum reference temperature and supplying a slower clock frequency with respect to the regular clock frequency of the clock signal to the electronic device when the temperature of the electronic device is beyond the maximum reference temperature; and (f) maintaining the maximum rotational speed of the fan and supplying the slower clock frequency of the clock signal to the electronic device until the temperature of the electronic device drops below the maximum reference temperature.

6. The method as claimed in claim 5, further comprising a step of stopping the fan when the detected temperature of the electronic device is below a minimum reference temperature that is smaller than the maximum reference temperature.

* * * * *

UNITED STATES PATENT AND TRADEMARK OFFICE
CERTIFICATE OF CORRECTION

PATENT NO. : 6,777,900 B2
DATED : August 17, 2004
INVENTOR(S) : Hung-Pin Lee

It is certified that error appears in the above-identified patent and that said Letters Patent is hereby corrected as shown below:

<u>Title page, Item [54] and Column 1, line 1,</u>
Title, delete the word "HEAR" and insert the word -- HEAT --.

Signed and Sealed this

Twenty-first Day of December, 2004

JON W. DUDAS
*Director of the United States Patent and Trademark Office*